United States Patent [19]
Zbikowski et al.

[11] Patent Number: 5,752,252
[45] Date of Patent: May 12, 1998

[54] STORAGE OF FILE DATA ON DISK IN MULTIPLE REPRESENTATIONS

[75] Inventors: Mark Zbikowski, Woodinville; Robert I. Ferguson, Seattle, both of Wash.

[73] Assignee: Microsoft Corporation, Redmond, Wash.

[21] Appl. No.: 690,014

[22] Filed: Jul. 31, 1996

Related U.S. Application Data

[63] Continuation of Ser. No. 85,543, Jun. 30, 1993, abandoned.
[51] Int. Cl.⁶ ........................................ G06F 12/02
[52] U.S. Cl. ........................ 707/205; 707/101; 707/103
[58] Field of Search ............................ 395/621, 427, 395/444, 401; 707/205, 101

[56] References Cited

U.S. PATENT DOCUMENTS

| | | | |
|---|---|---|---|
| 4,536,837 | 8/1985 | Olson et al. | 395/600 |
| 4,775,969 | 10/1988 | Osterlund | 369/53 |
| 5,119,291 | 6/1992 | Flannagan et al. | 395/275 |
| 5,200,864 | 4/1993 | Dunn et al. | 360/48 |
| 5,206,939 | 4/1993 | Yanai et al. | 395/400 |
| 5,276,874 | 1/1994 | Thomson | 395/600 |
| 5,297,124 | 3/1994 | Plotkin et al. | 369/32 |
| 5,394,534 | 2/1995 | Kulakowski et al. | 395/425 |
| 5,410,694 | 4/1995 | Uchida et al. | 395/600 |
| 5,454,103 | 9/1995 | Coverston et al. | 395/621 |
| 5,506,983 | 4/1996 | Atkinson et al. | 395/611 |
| 5,613,105 | 3/1997 | Zbikowski et al. | 395/611 |

FOREIGN PATENT DOCUMENTS

0 488 700 A2  6/1992  European Pat. Off. ......... G06F 3/06

OTHER PUBLICATIONS

W. Richard Stevens, *Advanced Programming in the UNIX Environment*, pp. 56–60, 92–95 and 99–101 (1993) Jun. 1993.

*Primary Examiner*—Thomas G. Black
*Assistant Examiner*—Hosain T. Alam
*Attorney, Agent, or Firm*—Christensen, O'Connor, Johnson & Kindness PLLC

[57] ABSTRACT

File data is stored in a number of different representations on disk. File data is stored in streams which may assume any of several different representations. Each stream has an associated stream descriptor which describes how the stream is stored on the disk. The representations include storage of a stream in a single extent, storage of a stream in multiple extents and storage of a stream in an associated stream descriptor.

21 Claims, 9 Drawing Sheets

STORAGE OF FILE DATA ON DISK IN MULTIPLE REPRESENTATIONS

CROSS-REFERENCE TO RELATED APPLICATION

This application is a continuation of U.S. patent application Ser. No. 08/085,543, filed Jun. 30, 1993, now abandoned.

TECHNICAL FIELD

The present invention relates generally to data processing systems and, more particularly, to storage of data on disk by a file system.

BACKGROUND OF THE INVENTION

Conventional file systems have had difficulty in storing file data on disk in an efficient manner. Many conventional systems have adopted an approach wherein all data is stored in a single-sized storage unit on disk. Unfortunately, this approach does not efficiently store file data on disk. In particular, file data may vary in size and, thus, may not be well-matched for the predetermined storage unit size. Other conventional systems have provided a user with an option of adopting one of numerous different formats. The decision as to which format to adopt must be made before the file data is available to the user. As a result, the choice of format by the user is merely speculative and often does not correspond well with the actual file data. As a result, the file data is often inefficiently stored.

SUMMARY OF THE INVENTION

In accordance with a first aspect of the present invention, a method is practiced in the file system of a data processing system. In this method, a description of a first stream of file data, having a type field and a description field that describes the storage of the stream, is stored in disk storage as the description field. The first stream constitutes a logically contiguous array of bytes of file data. A type identifier is stored in the type field of the stream descriptor.

In this method, the first stream may be stored in a number of different representations. In a first representation, the file data of the first stream is stored in the description field of the stream descriptor, and the type field stores a type identifier that specifies this immediate representation. In a second representation, the file data of the first stream is stored in a single extent in the disk storage. The type field holds an identifier that notes that the file data of the first stream is stored in a single extent. The extent address may be stored in the description field of the stream identifier. In a third representation, the description field of the stream descriptor holds a second stream descriptor that describes a stream of extents in which the file data of the first stream is stored. The type field specifies that the file data of the first stream is held in multiple extents.

The type field of the stream descriptor for the first stream may also be used to designate that special handling of data are stored in the first stream. For instance, the type field may hold an identifier specifying that the description field of the first stream descriptor describes replicated data. In such a case, the description field holds a second stream descriptor describing a second stream and a third stream descriptor describing a third stream. The second stream and the third stream hold replicas of the same file data. The type field may also hold an identifier indicating that the description field of the first stream descriptor holds a second stream descriptor that describes a stream of compressed data. The description field holds a second stream descriptor that describes the stream of compressed data. Still further, the type field may hold an identifier which indicates that the description field holds a second stream descriptor describing a stream of encrypted data.

The various types of representations of streams available in the present invention may be stored together on a single disk. Thus, a disk may include a stream held in a stream descriptor, a stream held in a single extent and/or a stream held in multiple extents.

DETAILED DESCRIPTION OF THE INVENTION

The preferred embodiment of the present invention provides a file system that stores files on disks as groups of "streams." Each file is extensible at an end that is designated by an end-of-file marker. A "stream" is a logically contiguous, randomly addressable, variable-sized array of bytes of data that serves as the smallest unit of storage on a disk. Most programmatic access to data in files is made through streams. Each stream may be stored on the disk in one of a number of different representations. Each of the different representations is well suited for a particular size and use of stream. Accordingly, each stream is stored in a representation on disk that is best suited for its size.

Each stream has a stream descriptor associated with it. The stream descriptor is used to access the stream and to obtain information about the stream. The stream descriptor provides a description of the representation in which the data of the streams is stored. Stream descriptors are stored in file system control structures associated with respective files.

Figure 1:
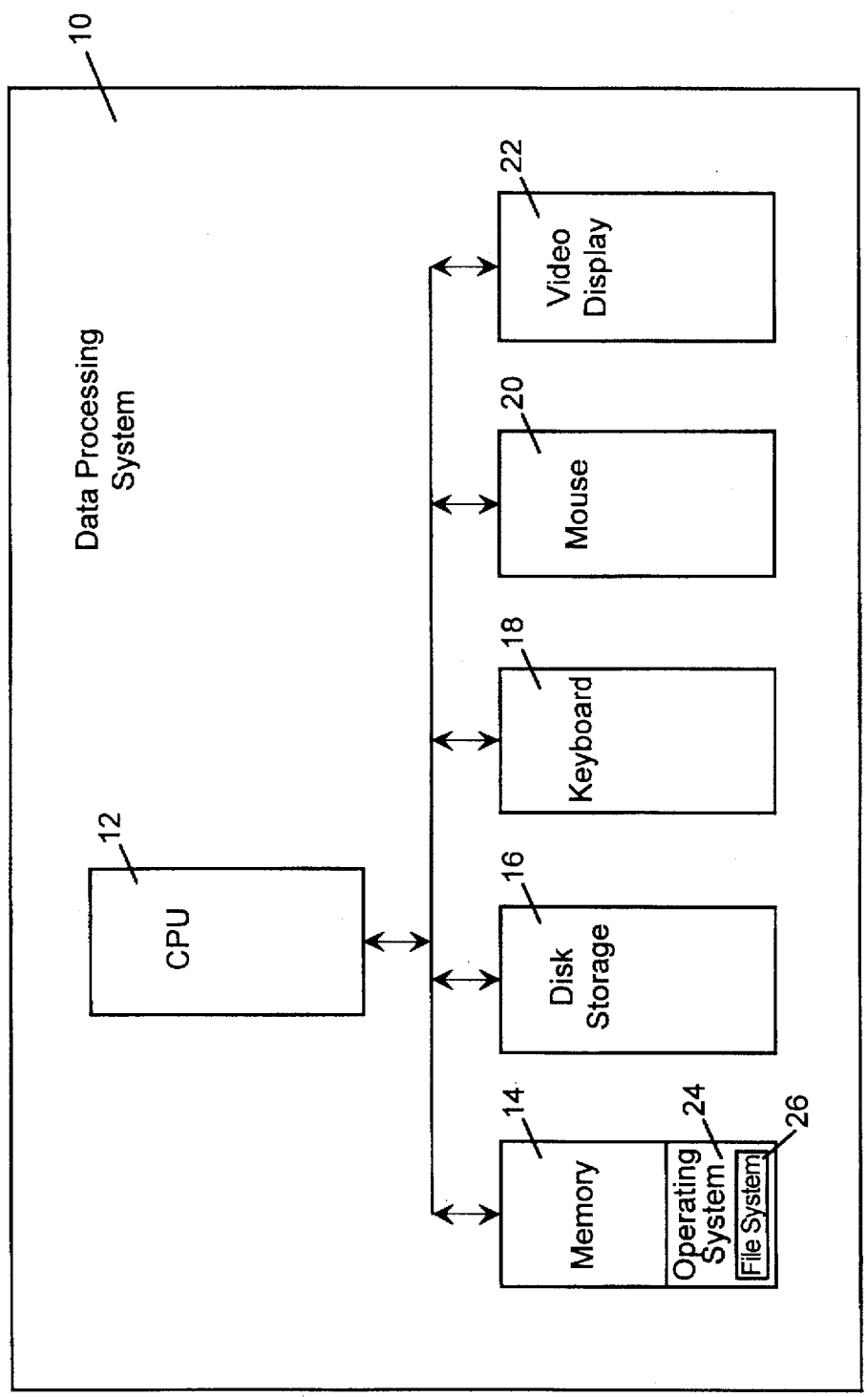
FIG. 1 is a block diagram of a data processing system for practicing a preferred embodiment of the present invention.

FIG. 1 is a block diagram of a data processing system 10 for practicing the preferred embodiment of the present invention. Although the system 10 of FIG. 1 is a single processor system, those skilled in the art will appreciate that the present invention may also be practiced in a multiple processor system, such as a distributed system. The data processing system 10 includes a central processing unit (CPU) 12, a memory 14, disk storage 16, a keyboard 18, a mouse 20, and a video display 22. The memory 14 holds a copy of an operating system 24, including a file system manager 26 for managing files stored in the system. The operating system 22 may be an object-oriented operating system. Files are stored in the disk storage 16 as streams. The disk storage 16 may include hard disks and other types of disk storage devices. The keyboard 18, mouse 20, and video display 22 are conventional input/output devices.

Figure 2:
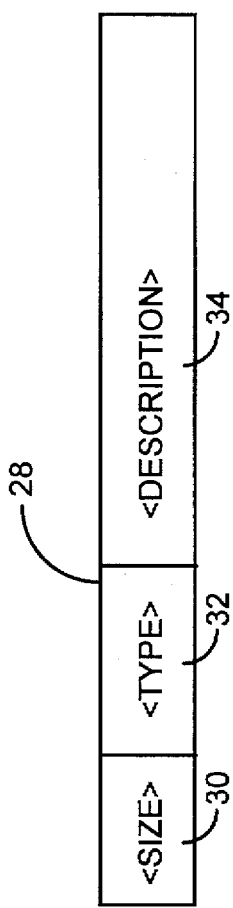
FIG. 2 is a diagram of the format for a stream descriptor that is used in the preferred embodiment of the present invention.

As mentioned above, streams are available in a number of different representations in the preferred embodiment of the present invention. In order to understand the different representations of streams, it is helpful to review the format of the stream descriptors that are provided for streams. FIG. 2 is a diagram of the format of a stream descriptor 28. The stream descriptor 28 is capable of describing each of the different representations of streams that are available in the preferred embodiment of the present invention. The stream descriptor 28 includes three fields: a size field 30, a type field 32 and a description field 34. The size field 30 holds a value that specifies the size of the stream in bytes. The type field 32 specifies the type of the stream, and the description field 34 holds a description of the stream. The values held in fields 30, 32 and 34 vary with the representation of the associated stream (as will be described in more detail below).

A "tiny stream" is a first representation of a stream that is available in the preferred embodiment of the present invention. The tiny stream is used to store data that is very small in size relative to the allocation unit of the storage medium (i.e., a disk in the disk storage 16). The "allocation unit" of the storage medium refers to the basic unit of disk memory space in disk storage 16 that is allocated for storing files. For instance, in FAT-based file systems, the minimum allocation unit is a disk sector. Unfortunately, the disk sector is often much larger than the data that is to be stored together.

Figure 3:
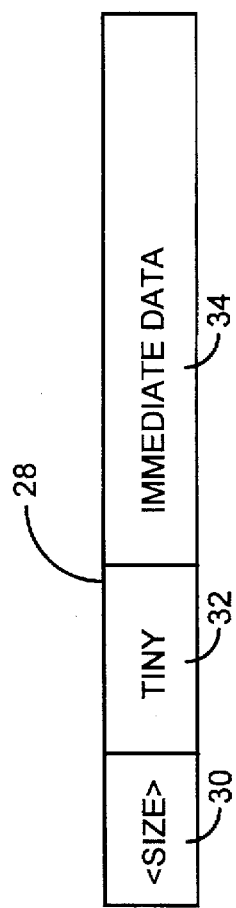
FIG. 3 is a diagram of a stream descriptor for a tiny stream in accordance with the preferred embodiment of the present invention.

FIG. 3 depicts the format of the stream descriptor 28 for the tiny stream. The size field 30 holds a value that specifies the size of the stream, and the type field 32 specifies that the stream is a tiny stream. The description field 34 holds the data of the stream and, thus, provides an immediate representation of the data of the stream. This immediate representation provides a very efficient means for storing small amounts of data. In particular, the data is integrated directly into the stream descriptor so that it may be easily and quickly accessed.

Figure 4:
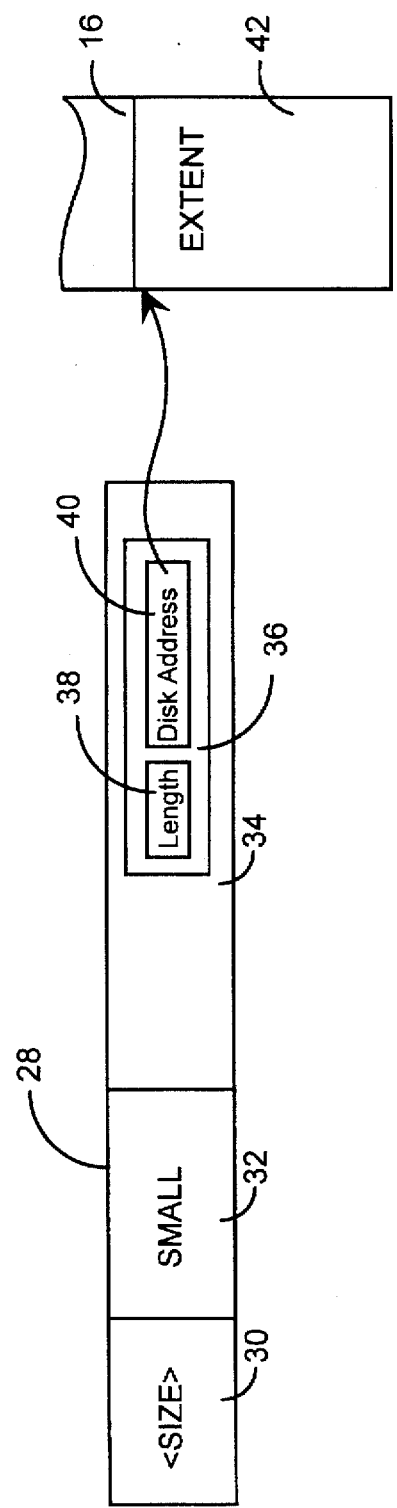
FIG. 4 is a diagram of a stream descriptor for a small stream in accordance with the preferred embodiment of the present invention.

Another representation that is available in the preferred embodiment of the present invention is a small stream. The "small stream" is a stream that is stored in a single extent of data. An extent is a variable-sized contiguous run of allocation units. The stream data is stored in an extent because it is too large to store directly in the stream descriptor 28. The format of the stream descriptor 28 for the small stream is shown in FIG. 4. The type field 32 specifies that the associated stream is a small stream, and the description field 34 holds an extent descriptor 36 that describes an extent 42 in which the data of the stream is stored. The extent 42 is stored on a disk in the disk storage 16. The extent descriptor 36 includes two subfields 38 and 40. Subfield 38 holds a value that specifies the length of the extent 42, and subfield 40 holds the disk address of the extent (i.e., where the extent is located in the logical address space of the disk).

Figure 5:
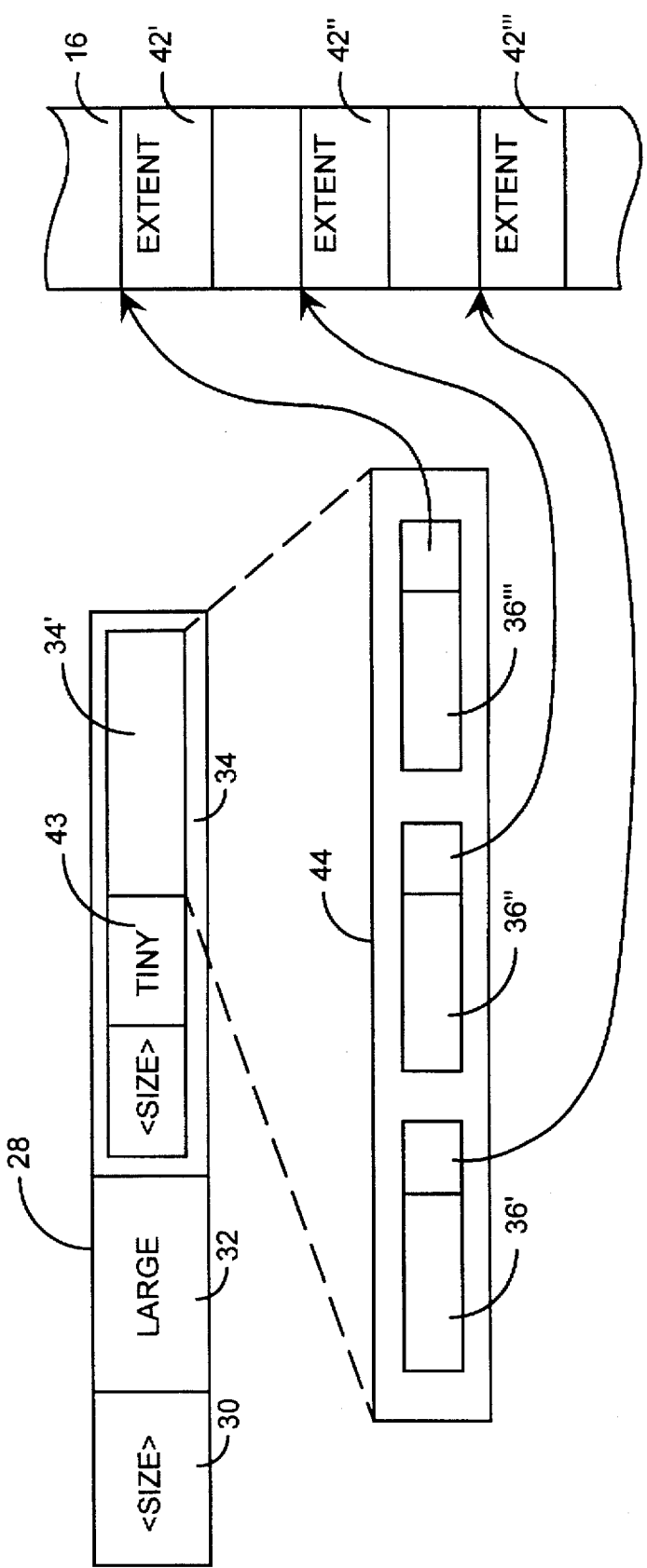
FIG. 5 is a diagram of a stream descriptor for a large stream in accordance with the preferred embodiment of the present invention.

A third representation that is available in the preferred embodiment of the present invention is a "large stream." The large stream is a stream stored in multiple extents. The large stream is appropriate for storing a stream having a large amount of data. FIG. 5 depicts the format of the stream descriptor 28 for such a large stream. Type field 32 specifies that the stream is a large stream. The description field 34 holds a second stream descriptor 43 that describes a stream 44 holding extent descriptors. This second stream descriptor 43 describes a tiny stream and includes a description field 34' that holds the stream 44 of extent descriptors. The extent descriptors 36', 36" and 36'" have the same format as the extent descriptor 36 that was described with reference to FIG. 4. As a result, multiple extents 42', 42" and 42'" are described by a single stream 34'. If the number of extent descriptors becomes too large, the second stream descriptor 43 may describe a small stream rather than a tiny stream. Large streams are generally used where large contiguous blocks of disk space are not available. The large stream facilitates the storage of large amounts of data as a single stream in extents that may be dispersed about the disk. As a result, large streams scale well as disks become more fragmented and the stream grows.

As the size of a stream grows, the representation of the stream is promoted up a hierarchy of stream representations to facilitate efficient storage of the stream. The hierarchy includes the tiny stream, the small stream and the large stream. A stream may be promoted from a tiny stream to a small stream and then to a large stream. In general, as was mentioned above, the most appropriate representation is chosen for a stream based upon the amount of data that is included in the stream.

Figure 6:
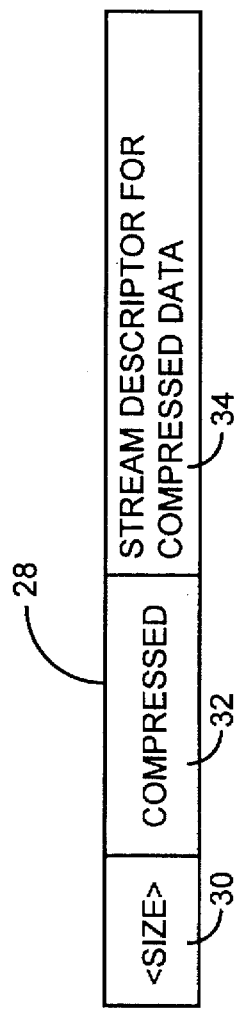
FIG. 6 is a diagram of a stream descriptor for a compressed stream in accordance with the preferred embodiment of the present invention.

The above description has described the four basic types of streams available in the preferred embodiment of the present invention. The type field 34 of stream descriptor 28 may also be utilized to specify special descriptions of data stored within a stream. FIG. 6 is an example of the format of the stream descriptor 28 when a stream holds compressed data. The type field 32 holds a value specifying that the data of the stream is compressed, whereas the description field 34 holds a stream descriptor for the compressed data. The stream descriptor held in the description field 34 may be a tiny stream, a small stream, or a large stream, depending upon the amount of data included in the stream.

Figure 7:
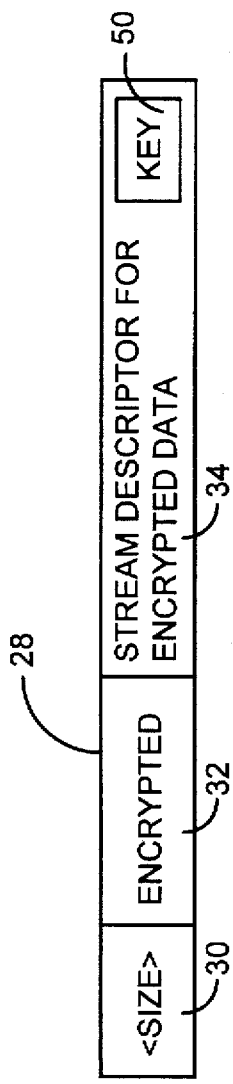
FIG. 7 is a diagram of a stream descriptor for an encrypted stream in accordance with the preferred embodiment of the present invention.

FIG. 7 depicts the format of a stream descriptor 28 when the stream descriptor describes a stream of encrypted data. Type field 32 holds a value which specifies that the stream holds encrypted data. The description field 34 holds a stream descriptor for the encrypted data. The stream descriptor also includes an encryption key value 50. The encryption key value 50 may be used to decrypt the data stored in the stream. The stream descriptor for the encrypted data that is held in the description field 34 may be a tiny stream, a small stream, or a large stream.

Figure 8:
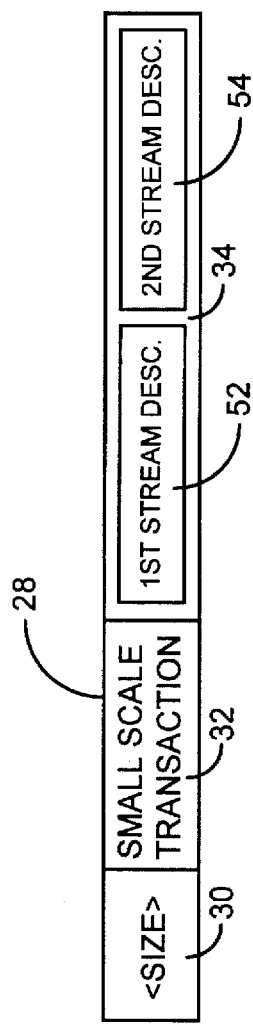
FIG. 8 is a diagram of a stream descriptor for a small scale transaction in accordance with the preferred embodiment of the present invention.

Another example of the use of the type field 32 to specify special descriptions of data is shown in FIG. 8. FIG. 8 shows the stream descriptor 28 for a small scale transaction. A small scale transaction refers to an instance wherein changes to data in a database are recorded without directly changing the data until a sufficient number of other changes have occurred to warrant incurrence of the overhead associated with changing all of the affected data. The type field 32 specifies that the description field 34 holds data for a small scale transaction. The description field 34 holds a first stream descriptor 52 and a second stream descriptor 54. The first stream descriptor 52 describes an original stream of data. The second stream descriptor 54 describes a stream that specifies the changes that have been made to the original stream. The original stream of data is updated by implementing the changes held in the second stream.

Figure 9:
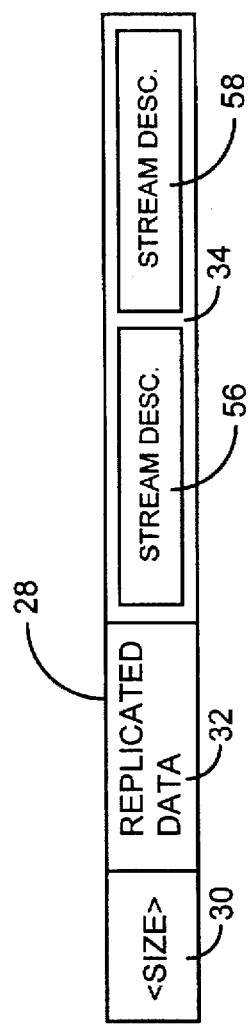
FIG. 9 is a diagram of a stream descriptor for replicated data in accordance with the preferred embodiment of the present invention.

FIG. 9 shows an example of the stream descriptor 28 for a stream that holds replicated data. Data often must be replicated so that loss of the data will not be catastrophic. Specifically, there are selected data structures for which the system maintains multiple copies on disk. In such instances, the structures are copied to two different locations on the disk. The stream descriptor 28 includes a first stream descriptor 56 and a second stream descriptor 58 in its description field 34. The first stream descriptor 56 describes a first stream holding a first copy of the data, and the second stream descriptor 58 describes a second stream holding another copy of the data. The type field 32 holds a value specifying that the stream includes replicated data.

From the above discussion, it should be apparent that the present invention provides a means for minimizing internal fragmentation of file data stored on disk by storing stream data in a representation that best corresponds with the size of the stream and the state of the disk. Moreover, it does not require an a priori decision as to the size of allocation units. Accordingly, the present invention facilitates more efficient storage of data on the disk.

While the present invention has been described with reference to a preferred embodiment thereof, those skilled in the art will appreciate that various changes in form and detail may be made without departing from the present invention as defined in the appended claims.

We claim:

1. In a file system of a data processing system having secondary storage, a method of storing a file in file storage structures provided by the file system on the secondary storage by the file system, comprising the steps of:

(a) storing at least a portion of contents of the file in a first stream file storage structure of a given type on the secondary storage;

(b) storing a first stream descriptor for the first stream file storage structure on the secondary storage, said first stream descriptor having a description field and a type field, and said storing of the first stream descriptor comprising the steps of:

(i) storing a description of the first stream file storage structure in the description field of the first stream descriptor; and (ii) storing a type identifier that identifies the type of the first stream file storage structure in the type field of the first stream descriptor.

2. The method as recited in claim 1 wherein the step of storing the description of the first stream file storage structure in the description field further comprises the step of storing the first stream file storage structure in the description field and the step of storing the type identifier of the first stream file storage structure in the type field further comprises the step of storing an identifier in the type field which specifies that the contents of the first stream file storage structure is stored in the description field.

3. The method as recited in claim 1 wherein the step of storing the description of the first stream file storage structure in the description field further comprises the step of storing an address in the description field to an extent stored in the disk storage that holds the first stream file storage structure and the step of storing the type identifier of the first stream file storage structure in the type field further comprises the step of storing an identifier in the type field which specifies that the first stream file storage structure is stored in a single extent.

4. The method as recited in claim 3 wherein the step of storing the description of the first stream file storage structure in the description field further comprises the step of storing a value which specifies a length of the extent in the description field.

5. The method as recited in claim 1 wherein the step of storing the description of the first stream file storage structure in the description field further comprises the step of storing a second stream descriptor in the description field, said second stream descriptor including an address of a second stream file storage structure holding descriptors of extents that store the first stream file storage structure and wherein the step of storing the type identifier of the first stream file storage structure in the type field further comprises the step of storing an identifier in the type field which specifies that the first stream file storage structure is stored in multiple extents.

6. The method as recited in claim 1 wherein the step of storing the description of the first stream file storage structure in the description field further comprises the step of storing a second stream descriptor and a third stream descriptor in the description field of the first stream descriptor wherein the second stream descriptor and the third stream descriptor describe replicas of a stream that are stored at different addresses and wherein the step of storing in the secondary storage the type identifier of the first stream file storage structure in the type field further comprises the step of storing an identifier which specifies that the description field of the first stream descriptor describes replicated data.

7. The method as recited in claim 1 wherein the step of storing the description of the first stream file storage structure in the description field further comprises the step of storing in the description field of the first stream file storage structure a second stream descriptor describing contents of a second stream file storage structure and a third stream descriptor describing a third stream which specifies changes to the contents of the second stream file storage structure and wherein the step of storing the type identifier of the first stream file storage structure in the type field further comprises the step of storing an identifier in the type field which specifies that the description field of the first stream file storage structure holds the second stream descriptor describing the second stream file storage structure and the third stream descriptor describing a third stream of changes to contents of the second stream file storage structure.

8. The method as recited in claim 1 wherein the step of storing the description of the first stream file storage structure in the description field further comprises the step of storing in the description field of the first stream file storage structure a second stream descriptor that describes a stream of compressed data and wherein the step of storing the type identifier of the first stream file storage structure in the type field further comprises the step of storing an identifier in the type field which specifies that the description field of the first stream descriptor holds a second stream descriptor that describes a stream of compressed data.

9. The method as recited in claim 1 wherein the step of storing the description of the first stream file storage structure in the description field further comprises the step of storing in the description field of the first stream descriptor a second stream descriptor that describes a second stream file storage structure holding encrypted data and wherein the step of storing the type identifier of the first stream file storage structure in the type field further comprises the step of storing an identifier in the type field which specifies that the description field holds a second stream descriptor which describes the second stream file storage structure holding encrypted data.

10. In a data processing system having a file system for managing files secondary storage, a method performed by the file system of storing a first stream file storage structure provided by the file system and holding contents of a first file and a second stream file storage structure provided by the file system holding contents of a second file on the secondary storage, comprising the steps of:

(a) storing the first stream file storage structure in the secondary storage as part of a first stream descriptor that describes the first stream file storage structure;

(b) storing the second stream file storage structure in an extent in the secondary storage; and (c) storing a second stream descriptor that describes the second stream file storage structure in the secondary storage, said second stream descriptor including an extent descriptor that describes the extent in which the second stream file storage structure is stored.

11. In a data processing system having an operating system that provides a file system and secondary storage, a method performed by the file system of storing a first stream file storage structure provided by the file system and holding contents of a first file and a second stream file storage structure provided by the file system and holding contents of a second file on the secondary storage, comprising the steps of:

(a) storing the first stream file storage structure in the secondary storage as part of a first stream descriptor that describes the first stream file storage structure;

(b) storing the second stream file storage structure of file data in extents in the secondary storage; and (c) storing a second stream descriptor that describes the second stream file storage structure in the secondary storage, said second stream descriptor including a third stream descriptor that describes a stream of extent descriptors for describing the extents in which the second stream file storage structure is stored.

12. In a data processing system having a file system and a disk storage, a method performed by the file system of storing a first stream file storage structure provided by the file system and holding contents of a first file and a second stream file storage structure provided by the file system and holding contents of a second file in the secondary storage, comprising the steps of:

(a) storing the first stream file storage structure in an extent in the secondary storage;

(b) storing a first stream descriptor that describes the first stream file storage structure in the secondary storage, said first stream descriptor including an extent descriptor that describes the extent in which the first stream file storage structure is stored;

(c) storing the second stream file storage structure in extents held in the secondary storage; and (d) storing a second stream descriptor that describes the second stream file storage structure in the secondary storage, said second stream descriptor including a third stream descriptor that describes a stream of extent descriptors for describing the extents in which the second stream file storage structure is stored.

13. A data processing system, comprising:

(a) secondary storage;

(b) first means for storing in the secondary storage a description of a stream file storage structure holding contents of a file that is stored in the secondary storage as a first field of a stream descriptor for the stream file storage structure; and (c) second means for storing in the secondary storage a type identifier as a second field of the stream descriptor in the secondary storage, the type identifier identifying how the stream file storage structure is stored in the secondary storage.

14. The data processing system as recited in claim 13 wherein the first means for storing stores the stream file storage structure in the secondary storage as the first field of the stream descriptor and the second means for storing stores the type identifier in the second field to specify that the stream file storage structure is stored in the first field.

15. The data processing system as recited in claim 13 wherein the first means for storing stores an extent descriptor, that describes an extent holding the stream file storage structure, in the secondary storage as the first field of the stream descriptor and the second means for storing stores the type identifier in the second field to specify that the stream file storage structure is stored in the extent.

16. The data processing system as recited in claim 13 wherein the first means for storing stores a second stream descriptor, that describes a stream of extent descriptors of extents that hold the stream file storage structure, in the secondary storage as the first field and the second means for storing stores the type identifier in the second field to specify that the stream file storage structure is stored in the extents.

17. A computer-readable storage media holding software for performing the steps of:

(a) storing at least a portion of contents of a file in a stream file storage structure of a given type on a secondary storage;

(b) storing a stream descriptor for the stream file storage structure on the secondary storage, wherein said stream descriptor has a description field and a type field, said storing of the stream descriptor comprising the steps of:

(i) storing a description of the stream file storage structure in the description field of the stream descriptor; and (ii) storing a type identifier that identifies the type of the stream descriptor.

18. A computer-readable storage media, holding:

a first stream file storage structure of a given type holding at least a portion of contents of a file;

a first stream descriptor for the first stream, comprising:
a description field holding a description of the contents of the first stream file storage structure; and
a type field holding a type identifier that identifies the type of the first stream file storage structure.

19. The computer-readable storage media of claim 18 wherein the first stream file storage structure is stored within the description field of the first stream descriptor.

20. The computer-readable storage media of claim 18 wherein the first stream file storage structure is stored in an extent beginning at an address and wherein the description field holds the address at which the extent begins.

21. The computer-readable storage media of claim 18 wherein the first stream file storage structure is stored in multiple extents and wherein the description field of the first stream descriptor that holds an address of a second stream file storage structure that holds descriptors of the extents in which the first stream file storage structure is stored.

* * * * *

UNITED STATES PATENT AND TRADEMARK OFFICE
CERTIFICATE OF CORRECTION

PATENT NO. : 5,752,252
DATED : May 12, 1998
INVENTOR(S) : M. Zbikowski et al.

It is certified that error appears in the above-identified patent and that said Letters Patent is hereby corrected as shown below:

| COLUMN | LINE | | |
|---|---|---|---|
| 5 (Claim 1, | 29 line 2) | prior to "secondary" insert --a-- | |
| 6 (Claim 10, | 66-67 lines 1-2) | "for managing files" should read --and a-- | |
| 7 (Claim 11, | 17 line 2) | after "and" insert --a-- | |
| 7 (Claim 12, | 41 line 6) | "the" should read --a-- | |
| 7 (Claim 13, | 60 line 2) | after "(a)" insert --a-- | |
| 8 (Claim 17, | 39 line 13) | "the" should read --a-- | |

Signed and Sealed this

Twentieth Day of October, 1998

Attest:

BRUCE LEHMAN

*Attesting Officer*     *Commissioner of Patents and Trademarks*